R. H. COLE.
SCREW CUTTING MACHINE.
No. 19,752. Patented Mar. 30, 1858.
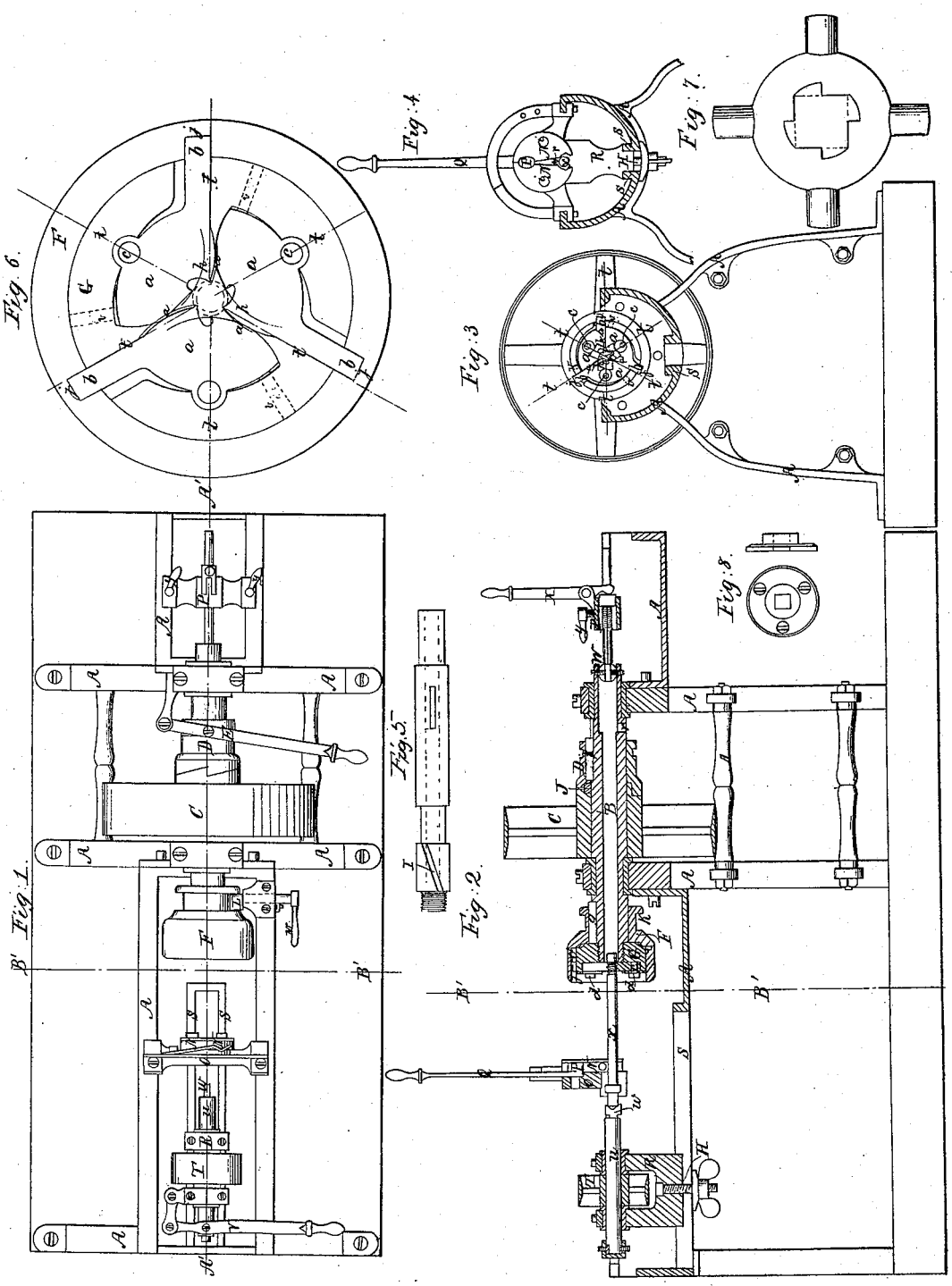

UNITED STATES PATENT OFFICE.

R. H. COLE, OF ST. LOUIS, MISSOURI.

SCREW-CUTTING MACHINE.

Specification of Letters Patent No. 19,752, dated March 30, 1858.

*To all whom it may concern:*

Be it known that I, RICHARD H. COLE, of the city of St. Louis, State of Missouri, have invented a new and Improved Screw-Cutting Machine; and I do hereby declare that the following is a full, clear, and exact description of the same, reference being had to the annexed drawing, making part of this specification, in which—

Figure 1 is a plan; Fig. 2 a section through A' A'; Fig. 3 a transverse section through B', showing the face of the chasing chuck, and Fig. 4 is also a section through B showing the face of the gripping tools for holding the bolt.

Similar letters of reference, represent corresponding parts, on the different figures.

My invention consists, first, in arranging a set of vibrating chasers, in a revolving chuck in such a manner that they may be opened and shut, while the chuck is in motion, with a face sufficient to cause them to enter the body of the blank, at any given point—and chase the thread on it, while running from the head toward the point in a single operation—and of so constructing and adjusting these chasers as to cause them to turn the blanks, to a given size before chasing the thread on it. Second. In devising a more efficient means for gripping, and holding the blank while the chasers are cutting the thread on it and of so arranging these grippers, that they may be converted into a die, for cutting the thread on the bolt in case it should be necessary. Third. In combining with the machine, for cutting the thread on the bolt an apparatus for turning the head at the same time the thread is cut on the point. Fourth. In combining in the opposite end, of the shaft, upon which the chasing chuck is placed, a universal chuck, to receive the shank of the top; whereby the nut, may be tapped, at the same time the thread is cut on the bolt.

A A &c. is the frame of the machine.
B is the main shaft.
C is the driving pulley.
D is a clutch, and E a lever, to work the said clutch, so as to stop and start the machine.

The chuck, A is made in the form shown on the drawing, and is screwed on the end of the shaft B as shown. The chasers $a, d, d,$ are placed in the front of the chuck, and are swung on centers $c\ c\ c,$ as shown at Fig. 3. Each of these chasers, is made with a projection on it, which reaches to beyond the periphery of the chuck, as shown at $b\ b\ b,$ and they are kept in their places, by means of the plate $d,$ which is held in its place, by means of the center bolts $c\ c\ c,$ around which the chasers vibrate.

Behind the chasing edge, of each chaser, a turning edge is raised, which is designed to turn off the scale, and reduce all the bolts, to a given size before the chasing edge, commences to act. The chasing edges, are shown at the end of the red lines $t\ t\ t$ and the turning edges are shown at the end of the lines $f\ f\ f.$ It will be seen by reference to Fig. 3, that there are two small red circles, drawn around the center of the chuck, and it will also be seen, that the chasing edges of the chasers reach to the inside circle, and the turning edge only to the outside circle. Now the chasers being swung on the centers $c\ c\ c,$ if a force be applied to the projections, $b\ b\ b,$ so as to open the chasers, the chasing edge will rise on the arc, $a,$ directly from the surface of the blank, and the turning edges will advance to, and recede from, the surface of the blank on the arc $h.$ Let the chasers be open, and suppose a blank bolt, to be introduced in them equal in size to the largest red circle, around the center. The chasers in closing will bring the turning edges in contact with the blank first which will turn it to a given size, before the chasing edges commenced to act. But as soon as the chasing edges commence to act the turning edges commence to recede, because they have then passed their center of vibration, which will cause them, to recede from the blank as fast as the chasing edges advance into it.

The chasers are open and shut by means of a sleeve, shown at F, which works on a feather, $g,$ fixed in the main shaft, on a helicoidal line, as shown at Fig. 5. This sleeve works over the chuck in which the chasers are swung, and it, has three grooves, cut longitudinally, in the inside of it, to receive the projections, on the chasers as shown at $j\ j\ j,$ and in the outside of this same sleeve the groove K is cut and in it, the eccentric L is made to work, by which, in conjunction with the lever, M the sleeve is worked back and forth on the shaft. Now as the sleeve works on a helical feather, it must receive a revolving, and a longitudinal motion, at one and the same time, whereby the sides of the grooves, $j\ j\ j$ are made to act on the projections, of the chasers, so as to open or shut them, as the case may require.

The chasers are adjusted, by means of the adjusting screws, shown in dotted lines at $b$ $b$, and the cuttings, are allowed to escape through openings, made in the shaft for that purpose, as shown at $r$.

If the chasers, shown at Fig. 3, were swung on plain centers, the joints, $t$ $t$ $t$ would open, every time the chasers were opened, to receive a blank, which would allow the cuttings to enter, and jam the chasers. To aviod this, eccentric pieces are put around the centers $c$ $c$ $c$ as shown, and the bottom of the grooves $j$ $j$ $j$ are cut to an inclination, as shown by the red line $O'$; so that the sleeve F in advancing will press hard against the ends of the projections, on the chasers, so as to cause the eccentrics, to move with them around the centers, thereby keeping the joints tight.

Fig. 6, shows a set of chasers constructed somewhat different from those shown at Fig. 3, and I think they are to be preferred to those. It will be seen that they are swung on plane centers, and that their points of contact are curves, instead of plains, and that these curves, are struck from the centers $c$, so that in opening, and closing, their points of contact will not recede the one from the other.

It is necessary in constructing these chasers to make the turning edge fall behind the line $f$ (when the chasers are in the position shown on the drawing) a distance equal to half of its vibration—that is, the vibration of the turning edge—the position is shown at Fig. 6.

The grippers for holding the blank, are shown at N N Fig. 4. They consist of two semicircular plates of steel, which are fixed against the cross head O on center shown at $i$ $i$, and between them, the cam P is introduced, which is a part of the lever Q. When it is desired to grip the blank H the lever is brought to a horizontal position, and when it is desired to release the blank the lever is raised to the position shown on the drawing, when the grippers are opened by the spring $n$. These grippers, may be converted into a die, for cutting the thread on the bolt if it should be found necessary, by simply removing the gripping pieces N N and supplying their places with similar pieces, having a thread cut in their jaws instead of a mere rough surface, made there, to keep the blank from turning; but in case the grippers were converted into a cutting die, it would be necessary to bolt the plate, shown at Fig. 8 against the face of the chuck, $a$ to hold the blank from turning.

The arrangement for turning the bolt head consists of a lathe, the head of which is shown at R, the spindle at U, the pulley at T, and a lever to work the spindle is shown at V. The lathe head has its seat on a pair of shears, cast on the frame of the machine, as shown at S, to which it is bolted, to any given position by means of the screw H. In the pulley T a feather is fixed, which works in a groove, cut in the spindle, along its whole length, so that the spindle can be worked back and forth by means of the lever V, whereby the turning tool, W, may be brought against the head of the bolt to turn it, while the chasers are cutting the thread on the other end.

The clutch D, works on a feather, shown at I, which is fixed in the shaft B, and the pulley C, is kept in its position by means of the collar J, which is secured to the shaft by means of a set-screw.

The arrangement for tapping the nut is shown at W Fig. 2. The device for holding the tap consists of a ball, which is introduced into the end of the shaft, B and which is held from turning by means of four centers or prongs, which work into slots cut longitudinally in the end of the shaft, so that the said ball can vibrate in any direction. In the center of this ball, which I shall call the tap holder, a square hole is made to receive the shank of the tap, the corners being cut out to the form shown at Fig. 11, which is a full sized figure of the said ball. The object of making the ball of the form shown in Fig. 11 is to allow the round part of the tap's shank to enter the holder, which, it will be seen, is of the same form that the tap is after being grooved. By this arrangement the strain, on the shank, is distributed through a greater amount of metal, and it is therefore not so liable to break off.

The cross head P in which the nut is held during the operation of tapping is shown at Figs. 1 and 2. It is made as broad as the cutting part of the tap is long, and on the upper side of it a fulcrum is cast to receive the lever X. Each end of the tap is made blank, and a little smaller than the center, or cutting part. The blank ends are made of considerable length, so as to hold a number of nuts at the same time.

Now let the cross head be fixed to its bearings by means of the set screws $y$ $y$, and let a number of nuts be placed on the out end of the tap. One of the nuts may be pressed forward by means of the lever, until the thread of the tap has taken hold of it, and as soon as it has gone through the cross head a succeeding one is pressed forward—and so on until the blank on the shank of the tap is full. The tap is then withdrawn, when the nuts drop off, which completes the operation.

What I claim as my invention and desire to secure by Letters Patent, is—

1. Arranging a set of vibrating, chasers ($a$ $a$ $a$) in a revolving chuck in such a manner that the said chasers, may be opened and shut while the chuck is in motion, and of so constructing, and adjusting, the said chasers, that they shall turn the bolt blank, to a given size, and chase the thread on it, in one and the same operation, substantially as shown on the drawing and as described in this instrument.

2. And I also claim, the combination of the two plates N N and the cam P with the cross head O substantially as shown and described for the purpose specified.

3. And I also claim, combining the turning lathe with the screw cutting machine, whereby the heads, of the bolts are turned, at the same time the chasers cut the threads on their points, in the manner set forth.

4. And I also claim, combining a universal chuck, in the opposite end of the same shaft, on which the chasing chuck is fixed, whereby the nut can be tapped, at the same time, the thread is cut on the bolts, and with the same power, and motion, substantially as herein specified.

R. H. COLE.

Witnesses:
AMOS BROADNAX,
P. W. JOHNSTONE.